US009911197B1

(12) United States Patent
Kim et al.

(10) Patent No.: US 9,911,197 B1
(45) Date of Patent: Mar. 6, 2018

(54) MOVING OBJECT SPOTTING BY FORWARD-BACKWARD MOTION HISTORY ACCUMULATION

(71) Applicant: HRL Laboratories, LLC, Malibu, CA (US)

(72) Inventors: Kyungnam Kim, Oak Park, CA (US); Changsoo S. Jeong, Rancho Palos, CA (US); Deepak Khosla, Camarillo, CA (US); Yang Chen, Westlake Village, CA (US); Shinko Y. Cheng, Cupertino, CA (US); Alexander L. Honda, Sunnyvale, CA (US); Lei Zhang, Torrance, CA (US)

(73) Assignee: HRL Laboratories, LLC, Malibu, CA (US)

( * ) Notice: Subject to any disclaimer, the term of this patent is extended or adjusted under 35 U.S.C. 154(b) by 408 days.

(21) Appl. No.: 14/204,471

(22) Filed: Mar. 11, 2014

Related U.S. Application Data

(60) Provisional application No. 61/783,453, filed on Mar. 14, 2013.

(51) Int. Cl.
*G06T 7/20* (2017.01)
*G06T 7/00* (2017.01)

(52) U.S. Cl.
CPC ............ *G06T 7/204* (2013.01); *G06T 7/0026* (2013.01)

(58) Field of Classification Search
None
See application file for complete search history.

(56) References Cited

U.S. PATENT DOCUMENTS

2011/0310983 A1* 12/2011 Funada .................. G09G 5/008 375/240.26

FOREIGN PATENT DOCUMENTS

CN 101635833 A * 1/2010

OTHER PUBLICATIONS

Kyungnam Kim, Yang Chen, Alexander Honda, Changsoo Jeong, Shinko Cheng, Lei Zhang, Deenak Khosla, "Bio-inspired Algorithms for Target Detection and Classification in Airborne Videos", in Proceedings of AUVSI's Unmanned Systems North America 2012 (AUVSI 2012).

(Continued)

*Primary Examiner* — Sumati Lefkowitz
*Assistant Examiner* — Jiangeng Sun
(74) *Attorney, Agent, or Firm* — Tope-McKay & Associates

(57) ABSTRACT

Described is a system for detecting moving objects using multi-frame motion history images. An input video sequence of consecutive registered image frames is received. The sequence of consecutive registered image frames comprises forward and backward registered image frames registered to a coordinate system of a reference image frame. Frame differences are computed between each of the consecutive registered image frames and the reference image frame. The frame differences are accumulated based on characteristics of the input video sequence to compute a corresponding motion response value. A selected threshold value is then applied to the motion response value to produce at least one binary image used for detection of moving objects in the input video sequence. Additionally, the invention includes a system for adaptive parameter optimization by input image characterization, wherein parameters that are based on characteristics of the image influence the motion detection process.

18 Claims, 11 Drawing Sheets

600

604 Source Characterization

606 Input Sequence → 608 Homography Estimation → 610 Image Registration → 602 Motion Detection

(56) References Cited

OTHER PUBLICATIONS

Aniruddha Kembhavi, David Harwood, and Larry S. Davis. Vehicle Detection Using Partial Least Squares. IEEE Trans. Pattern Anal. Mach. Intell, vol. 33, No. 6 (Jun. 2011), 1250-1265.
Paul A. Viola, Michael J. Jones: Robust Real-Time Face Detection. In ICCV 2001: 747.
Yoav Freund and Robert E. Schapire. A decision-theoretic generalization of on-line learning and an application to boosting. In Computational Learning Theory: Eurocolt '95, pp. 23-37. Springer-Verlag, 1995.
Y. LeCun, K. Kavukcuoglu and C. Farabet, "Convolutional Networks and Applications in Vision", in International Symposium on Circuits and Systems (ISCAS'10), IEEE, Paris, 2010.
C. Farabet, B. Martini, B. Corda, P. Akselrod. E. Culurciello and Y. LeCun, "NeuFlow: A Runtime Reconfigurable Dataflow Processor for Vision", in Proc. of the Fifth IEEE Workshop on Embedded Computer Vision (ECV'11 @ CVPR'11). IEEE, Colorado Springs, 2011. Invited Paper.
P.F. Felzenszwalb, R. B. Girshick, D. McAllester, and D. Ramanan. Object detection with discriminatively trained part-based models. IEEE Transactions on Pattern Analysis and Machines Intelligence, 32(9):1627-1645. 2009.
Z. Yin and R. Collins, "Moving Object Localization in Thermal Imagery by Forward-Backward Motion History Images," Book chapter in Augmented Vision Perception in Infrared, by Riad I. Hammound (Ed.), Springer-Verlag. Adv. Pattern Recognition Series, 2009, ISBN: 978-1-84800-276-0.
R. Szeliski in "Image alignment and stitching: A tutorial", Tech. Report MSR-TR-2004-92, Microsoft Research, Dec. 2004.
Lin et al. in "Map-Enhanced UAV Image Sequence Registration" in WACV, IEEE Computer Society, p. 15, 2007.

* cited by examiner

MOVING OBJECT SPOTTING BY FORWARD-BACKWARD MOTION HISTORY ACCUMULATION

GOVERNMENT LICENSE RIGHTS

This invention was made with government support under U.S. Government Contract Number HR0011-10-C-0033 Neovision2. The government has certain rights in the invention.

CROSS-REFERENCE TO RELATED APPLICATIONS

This is a Non-Provisional Application of U.S. Provisional Application No. 61/783,453, filed on Mar. 14, 2013, entitled, “Moving Object Spotting by Forward-Backward Motion History Accumulation.”

BACKGROUND OF THE INVENTION

(1) Field of Invention

The present invention relates to a system for detection of moving objects and, more particularly, to a system for detection of moving objects using forward and backward motion history accumulation.

(2) Description of Related Art

Automatic target spotting is a critical first step of any intelligence, surveillance, and reconnaissance (ISR) mission, as well as for many commercial surveillance applications. Motion history images are obtained after video stabilization through image registration. Accurate motion detection is still challenging, because the image registration results may have errors and the motion history images may not show the object boundaries clearly.

State-of-the-art motion based detection methods, such as described by Yin and Collins in “Moving Object Localization in Thermal Imagery by Forward-Backward Motion History Images,” Book chapter in Augmented Vision Perception in Infrared, by Riad I. Hammoud (Ed.), Springer-Verlag, Advanced Pattern Recognition Series, 2009 (hereinafter referred to as the Yin and Collins reference and hereby incorporated by reference as though fully set forth herein), simply accumulate motion history images and threshold the final accumulated image to obtain motion regions. However, these motion regions are often not correct due to partial- or over-detection of moving objects. When an object is moving slowly, a motion detection algorithm usually increases the number of frames used for motion accumulation to get more motion history outputs. However, it also increases motion areas by adding the area of the object's previous or next locations. In contrast to this, motion detection for fast moving objects produces the full body of the detected object, but also creates ghost detections in the previous and next frames.

Over- or partial-detections of objects can lead the subsequent object classification task to fail, since the object bounding boxes fed into the classification task are not like those used in classification training. Many methods for moving object detection on planar space (e.g., aerial videos) have been proposed in the field of computer vision. The technique of probabilistic motion pixel detection after ego-motion compensation, as described in the Yin and Collins reference, was fairly successful. However, object detection by just a fixed threshold value does not produce a tight and clear object boundary, since the accumulated motion history images (i.e., frame-to-frame differences) are different pixel-to-pixel in the object.

Each of the prior methods described above exhibit limitations that make them incomplete. Thus, a continuing need exists for object detection methods that tightly and correctly detect the locations of moving objects by using accumulation of forward-backward motion history images.

SUMMARY OF THE INVENTION

The present invention relates to a system for detection of moving objects and, more particularly, to a system for detection of moving objects using forward and backward motion history accumulation. The system comprises one or more processors and a memory having instructions encoded thereon such that when the instructions are executed, the one or more processors perform multiple operations. An input video sequence of consecutive registered image frames is received. The sequence of consecutive registered image frames comprises forward and backward registered image frames registered to a coordinate system of a reference image frame. Frame differences are computed between each of the consecutive registered image frames and the reference image frame. The frame differences are accumulated based on characteristics of the input video sequence to compute a corresponding motion response value. A selected threshold value is applied to the motion response value to produce at least one binary image for detection of moving objects in the input video sequence.

In another aspect, absolute values of the frame differences are accumulated to generate the motion response value. The selected threshold is applied to the motion response value according to the following:

$$D=Th[\Sigma_{i=0}^{2k}\text{abs}(F_k-F_i)],$$

where Th denotes threshold, Σ represents a summation, 2 k is the total number of registered image frames registered to the coordinate system of the reference image frame, abs represents absolute value, $F_k$ represents the reference image frame, and $F_i$ represents a registered image frame.

In another aspect, absolute values of the frame differences for forward and backward registered image frames are calculated, then accumulated separately to generate a motion response value for each of the forward and backward registered image frames. The selected threshold is applied to each of the motion response values. An intersection of the motion response values is computed according to the following:

$$D=Th[\Sigma_{i=0}^{k-1}\text{abs}(F_k-F_i)]\cap Th[\Sigma_{i=k+1}^{2k}\text{abs}(F_k-F_i)],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and ∩ represents an intersection.

In another aspect, polarized differences between the reference image frame and the consecutive registered image frames are accumulated for forward and backward registered image frames separately to generate a motion response value for each of the forward and backward registered image frames. The selected threshold is applied to each of the motion response values. An intersection of the motion response values is computed according to the following:

$$D=Th[\Sigma_{i=0}^{k-1}(F_k-F_i)]\cap Th[\Sigma_{i=k+1}^{2k}(F_k-F_i)],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and ∩ represents an intersection.

In another aspect, squared differences between the reference image frame and the consecutive registered image frames are calculated. The squared differences for forward and backward image frames are accumulated separately to generate forward and backward accumulations. A pixel-wise minimum value between the forward and backward accumulations is then determined. The selected threshold is applied to the pixel-wise minimum value according to the following:

$$D=Th[\text{Min}\{\Sigma_{i=0}^{k-1}(F_k-F_i)^2,\Sigma_{i=k+1}^{2k}(F_k-F_i)^2\}],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and Min represents minimization.

The present invention also comprises a system for adaptive parameter optimization by input image characterization. The system comprises one or more processors and a memory having instructions encoded thereon such that when the instructions are executed, the one or more processors perform multiple operations. First, an input image sequence comprising a plurality of image frames is received. At least one characteristic of the input image sequence is detected. At least one parameter is set based on the at least one detected characteristic, wherein the at least one parameter influences at least one of: applying homography estimation to the plurality of image frames to determine feature correspondences between each image frame and a reference image frame; registering each image frame into the reference frame based on the homography estimation; and selecting a motion detection method. Finally, at least one moving object in the input image sequence is detected.

In another aspect, the present invention comprises a method for causing a processor to perform the operations described herein.

In yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
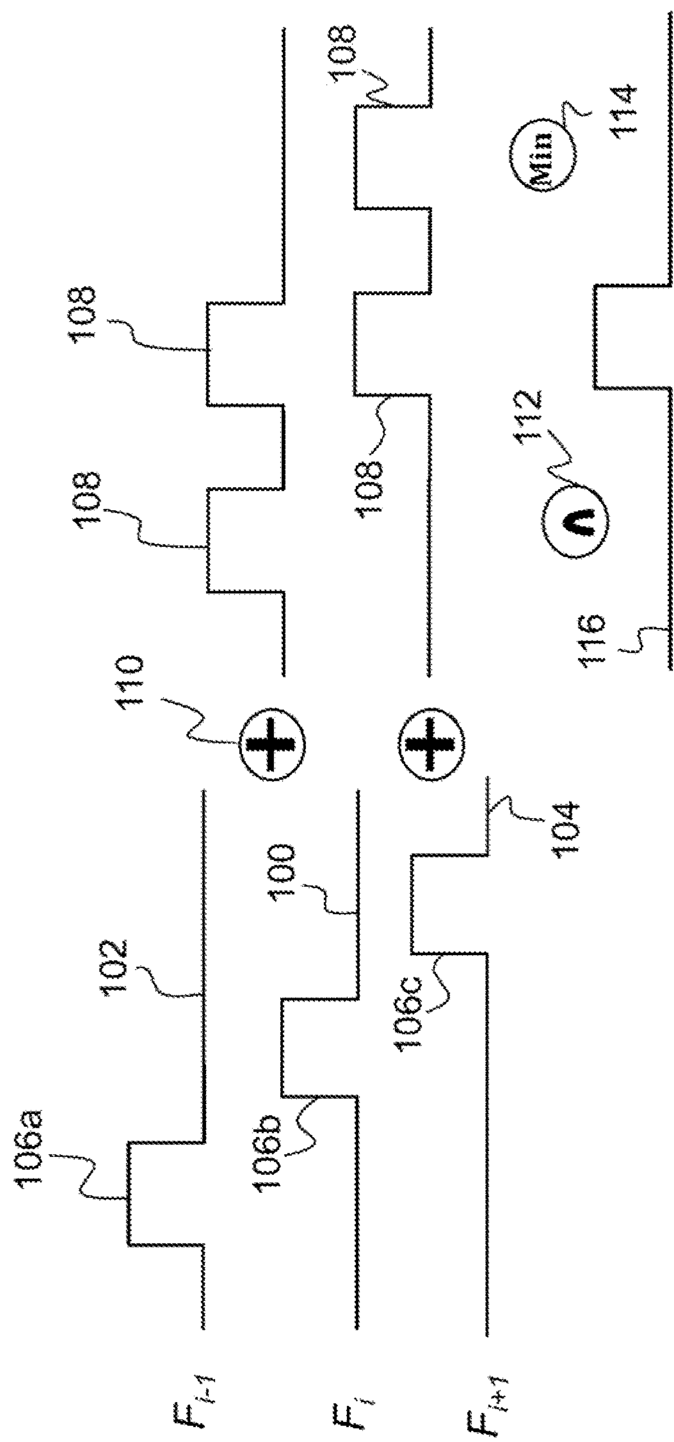
FIG. 1 illustrates an overview of motion history accumulation methods according to principles of the present invention.

The present invention relates to a system for detection of moving objects and, more particularly, to a system for detection of moving objects using forward and backward motion history accumulation. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for system for the detection of moving objects. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for the detection of moving objects. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Specific Details

This invention presents a set of object spotting/detection methods using forward and backward motion history accumulation on a planar space, such as in aerial videos. Automatic target spotting is the critical first step for any intelligence, surveillance, and reconnaissance (ISR) mission for target tracking and fingerprinting, threat detection, border protection, and so forth. Motion history images are obtained after video stabilization through image registration. Accurate motion detection is challenging, because image registration results may contain errors. Furthermore, the motion history images may not show the object boundaries clearly. In the present invention, four different motion detection methods for object spotting are described. As will be presented below, evaluation results show that each detection method has its own advantage, allowing a detection method to be selected based on characteristics of an input video sequence. Additionally, the present invention comprises adaptive parameter optimization by input source detection for automated optimal parameter setting.

The invention described herein is useful for ISR systems that need automatic target spotting of interesting targets observed in various sensor modalities including electro-optical (EO) and infrared (IR) sensors, with static, hand-held, and aerial platforms. Further, the invention is useful in commercial applications including, but not limited to, active vehicle safety and collision avoidance, automated driving, wide area surveillance, and crowd objects analysis.

(2.1) Detection by Forward-Backward Motion History Accumulation

Moving object detection involves detecting image regions that have motion regardless of the motion of the sensor obtaining the image (e.g., camera) itself, It is fairly simple to detect motion in an image sequence captured with a stationary camera, because the simple difference between images in the image sequence can show the object's motion. In contrast, motion detection of an image sequence captured with a moving camera is a complex process due to existing mixed motion pixels in an image caused by both a moving camera and moving objects. Thus, simple frame differences captured by moving camera sources are not representative of an object's motion. The frame differences could be caused by either the camera or the moving objects. Therefore, motion detection for a moving platform/sensor must detect movement after compensation for an ego (camera) motion via a planar image registration method, such as the image registration method described by R. Szeliski in "Image alignment and stitching: A tutorial", Tech. Report MSR-TR-2004-92, Microsoft Research, December 2004, which is hereby incorporated by reference as though fully set forth herein. The several images before and after a reference image are morphed/registered into the coordinate system of the reference image.

After successful image registration, motion detection on the reference image can be processed based on an image difference of consecutive, registered images. By taking the difference between the reference image and registered images, one can obtain a series of difference images. These difference images contain changes in pixels from moving objects as well as structures not contained within the planar subspace matched in registration. This method accumulates frame difference information from several registered frames in order to boost pixel scores within object regions, which would otherwise suffer from noise due to variations in pixel detection.

FIG. 1 illustrates the motion detection process of the present invention using differences between a reference image and registered images. In FIG. 1, the reference frame $F_i$ 100, registered previous frame $F_{i-1}$ 102, and registered next frame $F_{i+1}$ 104, are used for calculating frame differences. F depicts the intensity changes over a single pixel row or column for simplicity of explanation. Multiple previous and future frames can be used to obtain better detections. With these frame differences, one can accumulate pixel differences and apply a carefully selected threshold value to detect motion regions. Let the rectangular regions 106*a*, 106*b*, and 106*c* in the left part of FIG. 1 represent a moving object region in a one-dimensional slice of a frame. The rectangular regions 108 (i.e., motion regions) in each row of the right side of FIG. 1 are obtained by taking the difference (exclusive OR) of frames between the reference frame $F_i$ 100 and registered images (i.e., registered previous frame $F_{i-1}$ 102 and registered next frame $F_{i+1}$ 104).

After calculating the frame differences for both directions, forward (i.e., next frame) and backward (i.e., previous frame), one can apply the logical AND 110, INTERSECTION 112, or take MINIMUM values 114 of those differences to get the corresponding motion responses. This will leave only the moving object region in the reference frame $F_i$ by discarding the ghost detections of the moving object in the previous and next frames, resulting in a final image output 116.

The differences between the reference frame $F_i$ 100 and the registered images (i.e., registered previous frame $F_{i-1}$ 102 and registered next frame $F_{i+1}$ 104) indicate the differences in the moving object region. The final operation (i.e., AND 110, INTERSECTION 112, or MINIMUM 114) leaves out the true motion region in the reference frame $F_i$ 100 (i.e., the difference pixels only applicable to the reference frame $F_i$ 100). The final image output 116 is thresholded to get the motion regions in a binary format, where 1 represents motion and 0 represents background. A binary image is a digital image that has only two possible values for each pixel.

The goal is to find how to correctly detect this moving object region in a reference image given those frame differences. A single method cannot cover all possible different scenarios, which is why the present invention comprises multiple methods following a common framework, each with its own unique advantages. Four different detection methods were implemented, tested, and analyzed to determine their characteristics and advantages. The core differences between these detection methods are determining how to calculate the frame differences, determining how many registered frames to use, and determining a proper threshold. Two parameters, threshold and number of registered frames, are closely related to each other by the fact that using multiple pixel differences increases the ease of setting a threshold for separating binary detection regions.

For the purposes of this application, the methods are denoted as Method 1, Method 2, Method 3, and Method 4. To summarize, Method 1 accumulates absolute differences and thresholds the value; Method 2 computes the intersection of the accumulation of absolute differences and thresholds the value; Method 3 computes the intersection of accumulation of the polarized differences and thresholds the value; and Method 4 computes the minimum values of accumulation of the squared differences and thresholds the value.

Methods 1 and 4 need to have a carefully selected threshold value based on pixel differences to make a binary detection image. In contrast, the thresholds of Method 2 and Method 3 can simply be set to near zero values, because the intersection of forward-backward pixel differences only detects objects regions no bigger than the true object area in reference image. Additionally, object boundaries detected by Method 3 and Method 4 remain tight to the true object boundary in the reference frame, even if one increases the number of frames used for accumulation of differences. Conversely, Methods 1 and 2 increase the detection area by including the current frame's area as well as the object area from previous and future frames. Thus, one can select a proper detection method based on application-specific detains. Following is a detailed description of each detection method.

(2.1.1) Method 1: Accumulation of Absolute Differences

With Method 1, frame differences are calculated between a reference image and each registered frame, and the absolute value of the frame differences are accumulated. Then, a properly selected threshold is applied to create the binary image. Here, the threshold value should be carefully selected based on the pixel intensity of the accumulation of difference images. The threshold value should increase, as the number of registered images increases. This method can increase absolute pixel differences by adding more difference images so that the magnitude of the detection region (i.e., magnitude of the pixels in the detection region) along the forward-backward frames is increased to make the detection clearer in an image. This method is useful in cases when the relative object motion is slow and the detected region of an object is likely to be a partial detection. It is necessary to increase the number of registered frames so that slow moving objects can be detected. However, using many frames for registration can also lead to over-detection of the original object region.

The absolute differences for Method 1 are accumulated according to the following:

$$D=Th[\Sigma_{i=0}^{2k}\text{abs}(F_k-F_i)],$$

where Th denotes a binary thresholding operation (applied on an image frame) that outputs 1 for the pixel value greater than the pre-selected threshold value and 0 otherwise, and Σ represents a summation. k is the number of frames to be registered and used for motion history accumulation forward and backward in time, respectively, to each direction. The final detection image, D, is calculated for the current frame within a temporal sliding window starting from frame 0 to 2 k, where the frame index of the current/reference frame is k (in the center position in this window). abs represents the pixel-to-pixel absolute value operation, $F_k$ is the current/reference frame, $F_i$ represents the registered frame, and 2 k is the total number of registered frames registered to the coordinate system of the reference frame.

(2.1.2) Method 2: Intersection of Accumulation of Absolute Differences

Method 2 calculates the intersection for accumulation of absolute differences between a reference image and registered images, then thresholds this value to make a binary detection image. Absolute differences are calculated and accumulated between the reference image and registered frames for forward and backward from the reference frame separately. Each of these values is then thresholded with a predetermined threshold value to make a binary image, resulting in two binary images. Then, Method 2 calculates the intersection of the two binary images. Here, the threshold value should be selected based on accumulation of differences on each direction (i.e., forward and backward). Method 2 accumulates absolute pixel difference for forward and backward frames separately, thresholds them to make binary detection images, and then calculates their intersection region of final detection. The threshold value here is less sensitive than the one for Method 1, because the intersection is calculated for binary detection images for forward and backward directions. Method 2 also increases absolute pixel differences by adding more difference images. However, Method 2 also accumulates absolute pixel differences on each direction, so improper selection of the threshold value could also produce the over-detection problem similar to Method 1.

Method 2 calculates the intersection of accumulation of absolute values according to the following:

$$D=Th\left[\sum_{i=0}^{k-1}\text{abs}(F_k-F_i)\right]\cap Th\left[\sum_{i=k+1}^{2k}\text{abs}(F_k-F_i)\right],$$

where ∩ represents intersection between the forward and backward thresholded values.

(2.1.3) Method 3: Intersection of Accumulation of Polarized Differences

Method 3 calculates the intersection of the forward and backward intermediate binary maps. The intermediate forward and backward binary maps are the result of applying a threshold to the accumulations of polarized (i.e., non-absolute value) differences between a reference image and registered images in the forward and backward directions, respectively. Polarized (signed) differences are calculated between the reference frame and registered frames. Then, the differences are accumulated and thresholded with a zero-crossing value in order to make the binary image utilize the forward-backward directions. The method then calculates the intersection region between those two binary images. Method 3 accumulates signed pixel differences and calculates their intersection region, so any objects besides those in the reference image are regarded as negative objects. The threshold value with zero-crossing point could be used for making a binary detection image. For this reason, the detection for Method 3 will be tight around an object. Also, this method is particularly useful for detecting low contrast objects, darker objects on a dark background, and bright objects on a brighter background. Having signed values for frame differences retains their locations on both the reference frame and registered frames. This signed pixel difference leads to a low threshold value. By using a low threshold value to make a detection image, low contrast objects can be better detected.

The intersection of the accumulation of polarized differences for Method 3 is computed according to the following:

$$D=Th[\Sigma_{i=0}^{k-1}(F_k-F_i)]\cap Th[\Sigma_{i=k+1}^{2k}(F_k-F_i)].$$

(2.1.4) Method 4: Minimum Value of Accumulation of Squared Differences

Method 4 accumulates squared differences between a reference image and registered images in both the forward and backward directions, and then selects the minimum pixel values of those two accumulated difference images. The method then applies a threshold to create a binary detection image. Squared differences are calculated between a reference frame and registered frames, and the differences are accumulated independently for the forward and backward direction. The pixel-wise minimum value between the forward and backward accumulations is found, and a threshold is applied to create the binary image. Method 4 is more useful for tight detection of fast moving objects due to the last step of selecting the minimum value between the two detections. This minimum value selection of two detection images can suppress undesired detection areas from registered images, instead of from the reference image. Thus, the final detections from minimum values out of these two detections only produces tight region around objects. However, this method could be worse than the others if an object's motion is too slow. In this case, Method 4 cannot separate the detections of current frames from the registered frames.

The minimum value of accumulation of squared differences of Method 4 is computed according to the following:

$$D = Th\left[\text{Min}\left\{\sum_{i=0}^{k-1}(F_k - F_i)^2,\ \sum_{i=k+1}^{2k}(F_k - F_i)^2\right\}\right],$$

where Min represents a minimization operation that chooses the minimum value between two values for every pixel location.

(2.1.5) Evaluation of the Methods

FIGS. 2A-2D illustrate detection examples from select images using Methods 1 through 4, respectively, on moderate speed objects (i.e., objects moving not too fast and not too slow) in a sequence that was captured from an aerial platform. Each detection method (i.e., Method 1, Method 2, Method 3, and Method 4) can detect moving objects successfully, but the detection area of each detection method is slightly different due to the reasons described above.

Figure 2B:
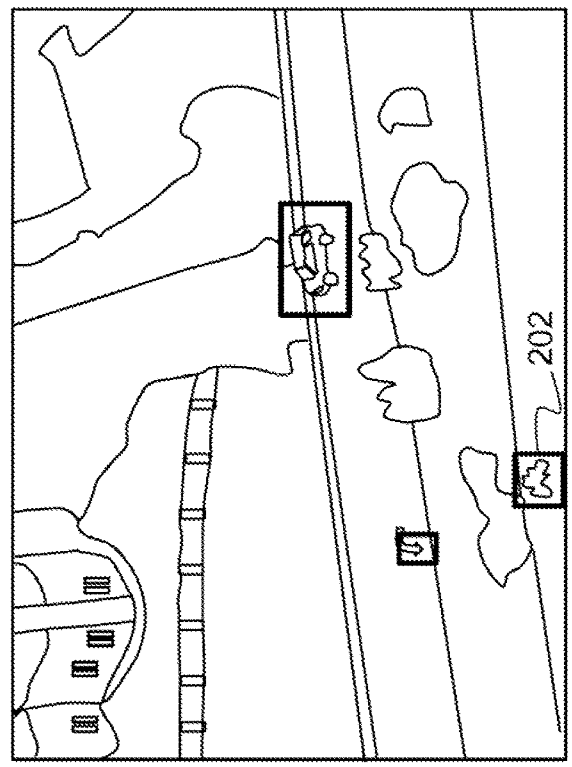
FIG. 2B illustrates results of detection of objects moving at moderate speeds by Method 2 according to principles of the present invention.
Figure 2A:
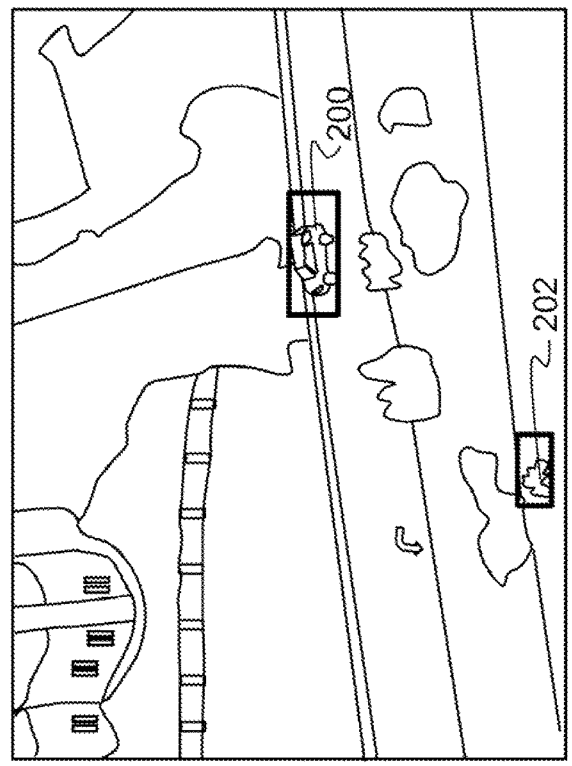
FIG. 2A illustrates results of detection of objects moving at moderate speeds by Method 1 according to principles of the present invention.
Figure 2D:
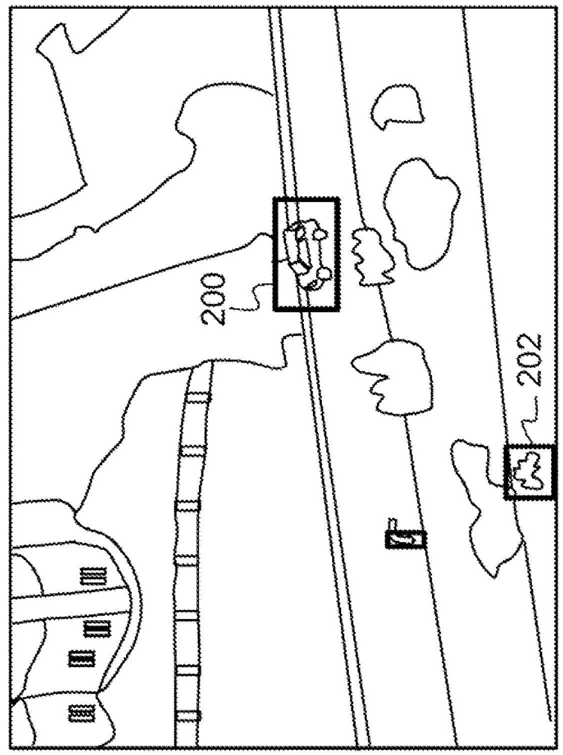
FIG. 2D illustrates results of detection of objects moving at moderate speeds by Method 4 according to principles of the present invention.
Figure 2C:
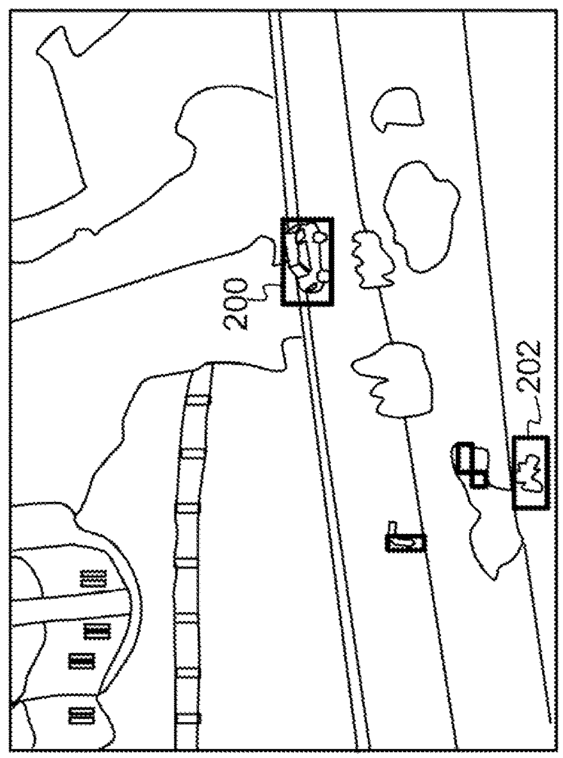
FIG. 2C illustrates results of detection of objects moving at moderate speeds by Method 3 according to principles of the present invention.

For instance, the results of Method 1, shown in FIG. 2A, depict detection of most of the object area from current to registered images (i.e., forward-backward frames). The detection area is indicated by a rectangle surrounding a moving object (e.g., car 200, bike 202). The results of the application of Method 2 are illustrated in FIG. 2B. Method 2 detects moving objects similarly to Method 1 (FIG. 2A), but creates a smaller detection area for the moving bike 202. The results of Method 3 and Method 4 are depicted in FIGS. 2C and 2D, respectively. Method 3 and Method 4 detect tight areas around the car 200 and bike 202, as indicated by smaller detection areas (i.e., rectangles surrounding the detected moving objects).

Figure 3A:
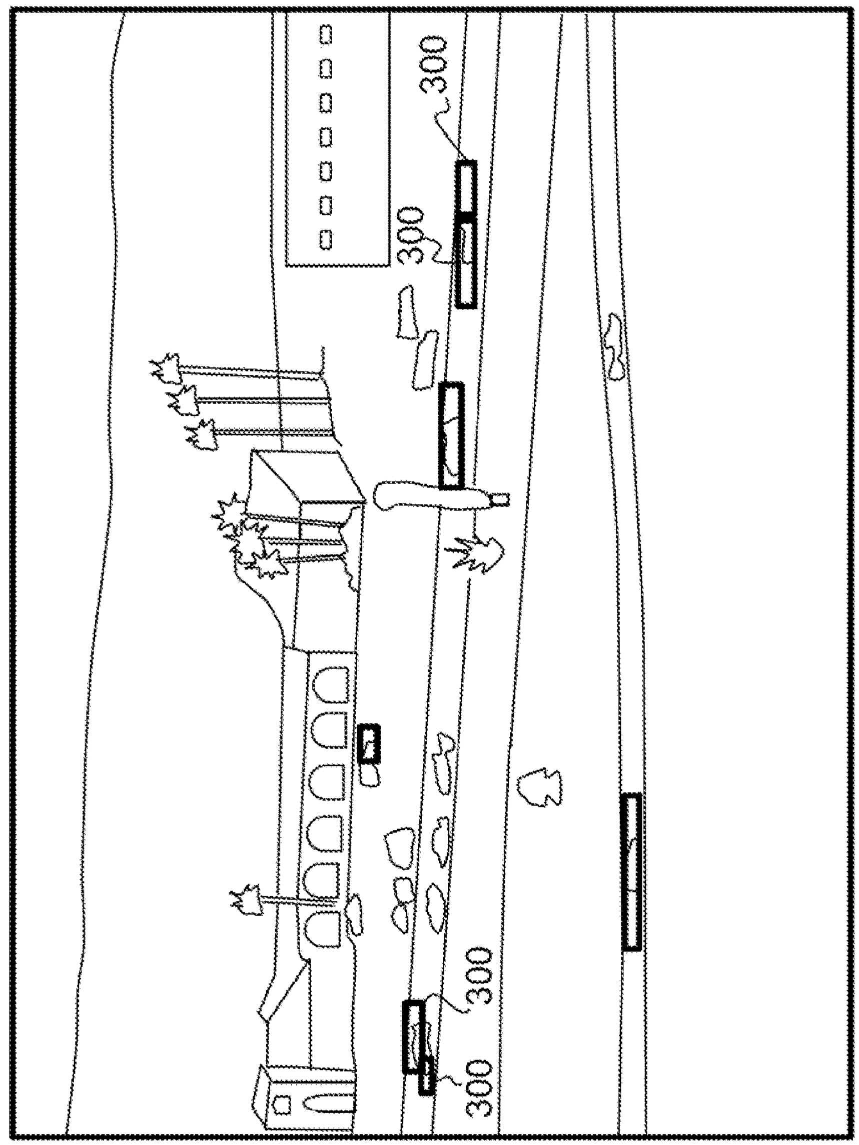
FIG. 3A illustrates results of detection of objects moving at high speeds by Method 1 according to principles of the present invention.
Figure 3B:
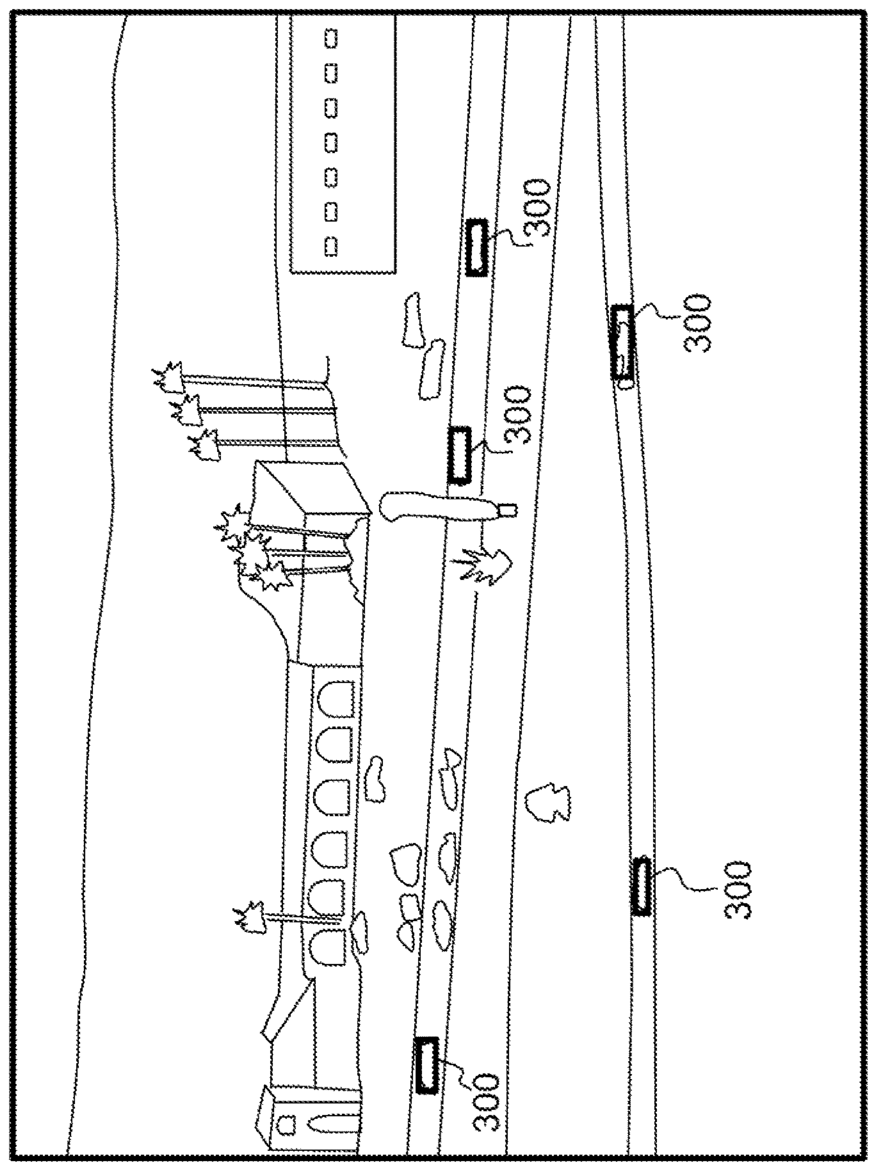
FIG. 3B illustrates results of detection of objects moving at high speeds by Method 3 according to principles of the present invention.

FIGS. 3A and 3B illustrate an example of detections on fast moving objects in a video sequence by Method 1 and Method 3, respectively. As shown, Method 3 (FIG. 3B) tightly detects moving objects on the current frame, as indicated by smaller detection areas 300 (i.e., rectangles surrounding the detected moving objects) compared to FIG. 3A. However, Method 1 (FIG. 3A) detects areas including current and forward-backward images, as indicated by multiple detection areas 300 near a first moving car and a second moving car.

Figure 4A:
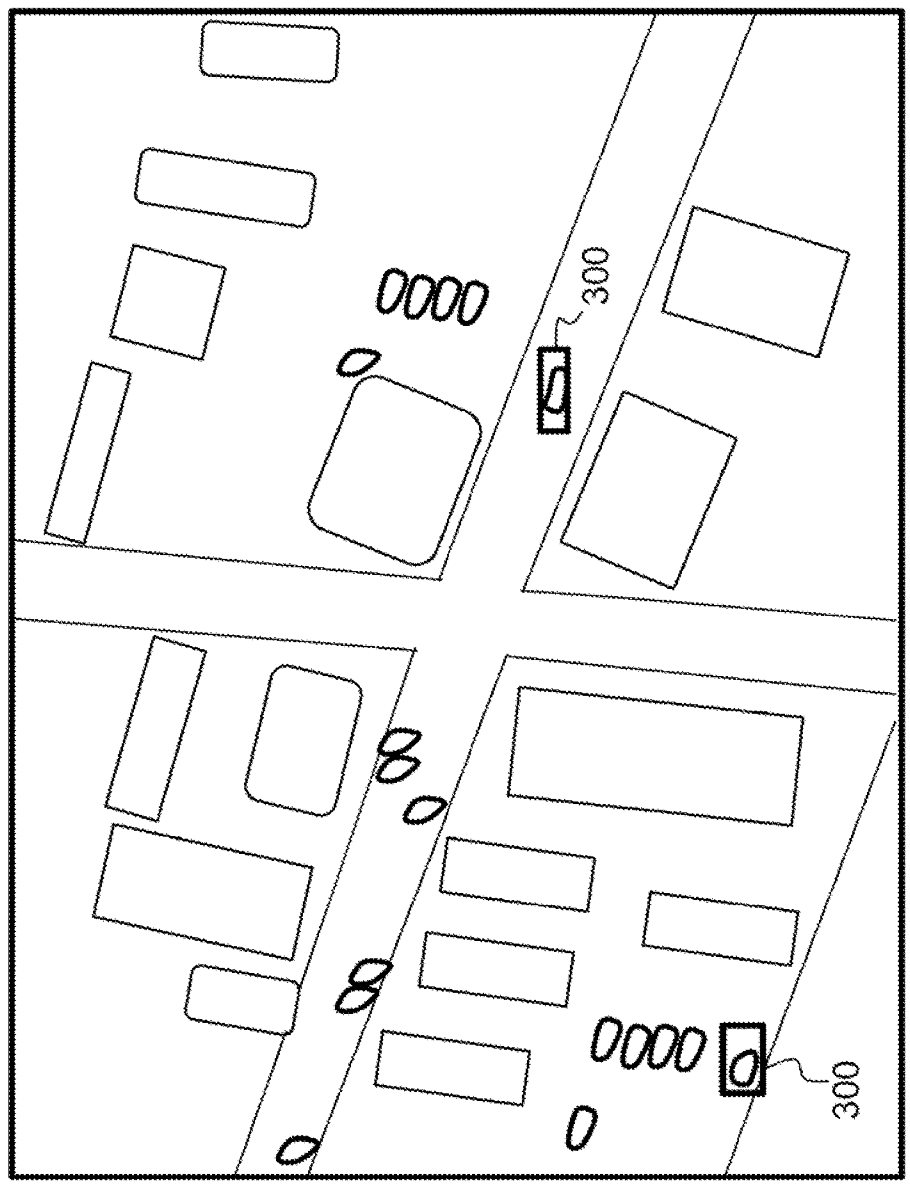
FIG. 4A illustrates results of detection of objects moving at high speeds by Method 2 according to principles of the present invention.
Figure 4B:
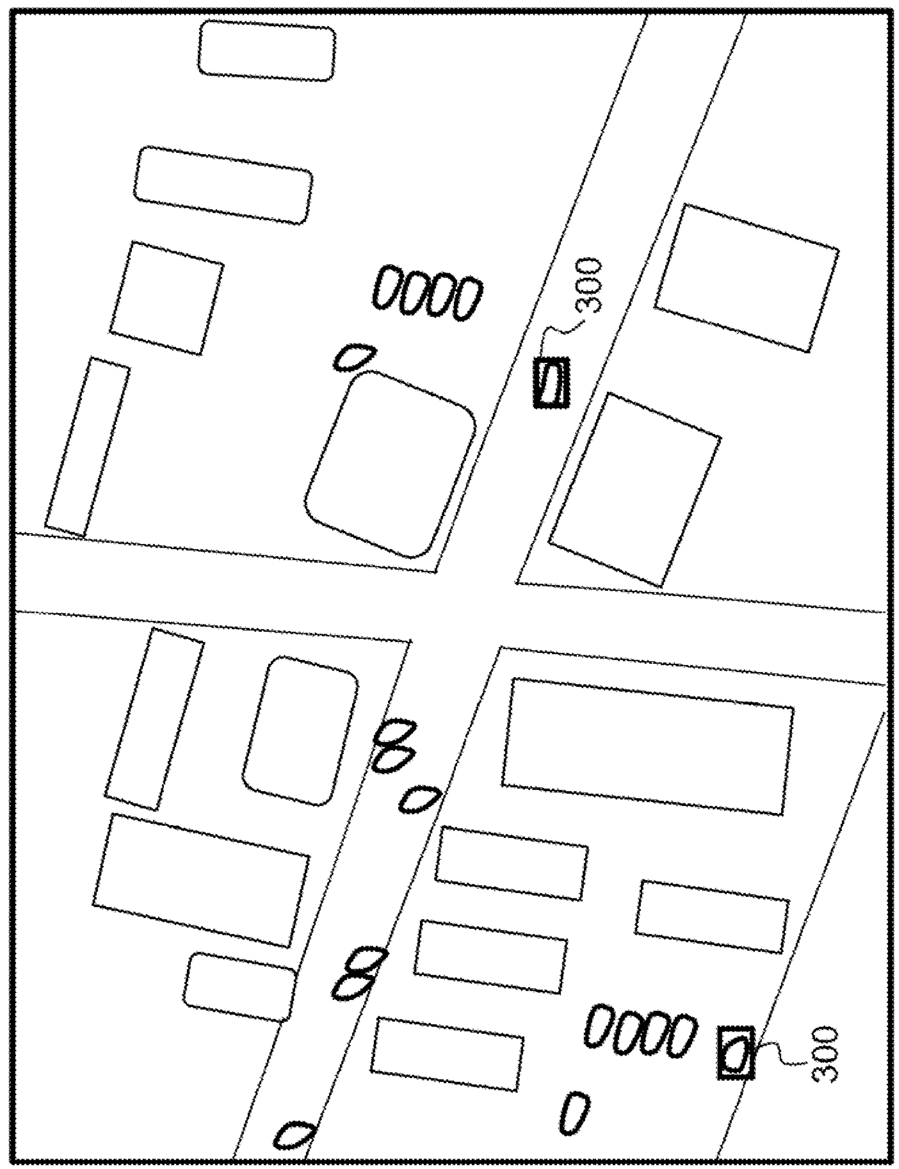
FIG. 4B illustrates results of detection of objects moving at high speeds by Method 4 according to principles of the present invention.

FIGS. 4A and 4B illustrate another example of detection on fast moving objects by Method 2 and Method 4, respectively. Method 4 (FIG. 4B) tightly detects moving objects on the current frame, as indicated by smaller detection areas 300 (i.e., rectangles surrounding the detected moving objects 400) compared to FIG. 4A. However, as with Method 1, Method 2 detects a larger area that includes current and forward-backward images. The tight detection of Method 3 and Method 4 is particularly beneficial to classification algorithms, which attempt to recognize semantic classes of these objects. Over-detection from Methods 1 and 2 can often produce detection areas encompassing multiple objects. These overly large detections can cause classification algorithms to fail to recognize objects.

Figure 5:
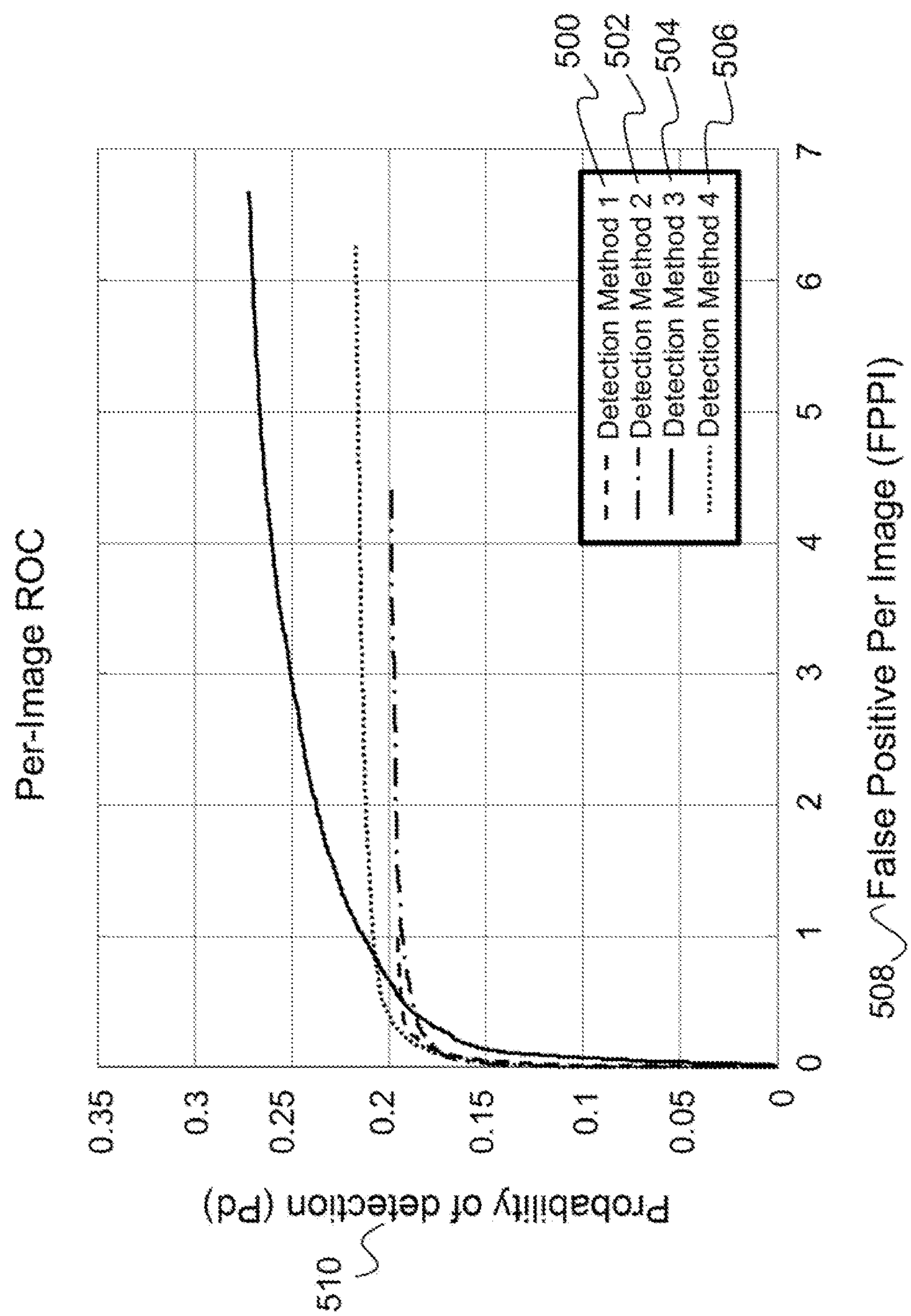
FIG. 5 illustrates a comparison of receiver operating characteristic (ROC) curves for detection of moving objects in aerial sequences using detection Methods 1-4 according to principles of the presenting invention.

FIG. 5 shows receiver operating characteristic (ROC) curves of the four detection methods (Method 1 500, Method 2 502, Method 3 504, Method 4 506) with fifty aerial sequences. A ROC curve is a graphical plot which illustrates the performance of a binary classifier system as its discrimination threshold is varied. Along the x-axis is the false positive per image (FPPI) 508, or false positive rate. Along the y-axis is the probability of detection (Pd) 510, which is the true positive rate. From the results of this particular test, detection Method 3 504 is shown to perform better than the other methods. However, since these detection methods have their own characteristics, they are all useful for different cases.

(2.2) Adaptive Parameter Optimization by Input Source Detection

As described above, applying motion detection algorithms for applications involving moving platforms is a challenging problem, because they tend to produce false objects due to camera motion. One of the most challenging issues is selecting initial parameters for the input source. Even though the present invention implements four different detection methods, not one of these methods consistently produces correct detections for different source characteristics (e.g., camera motion, contrast/brightness, object speed).

Parameter selection for motion detection algorithms plays an important role in obtaining better results. Incorrect selection of parameters causes poor performance of the motion detection algorithms. Threshold selection is one of the main issues for motion detection of frame difference data. After image registration, frame differences are calculated for determining motion between reference and registered images. Wrong selection of the threshold value leads to failure in the detection of objects or excessive noise. Thus, another aspect of the present invention is selecting how to set those parameters, including, but not limited to, the threshold value and the number of registered frames, based on the characteristics of input sources.

Figure 6:
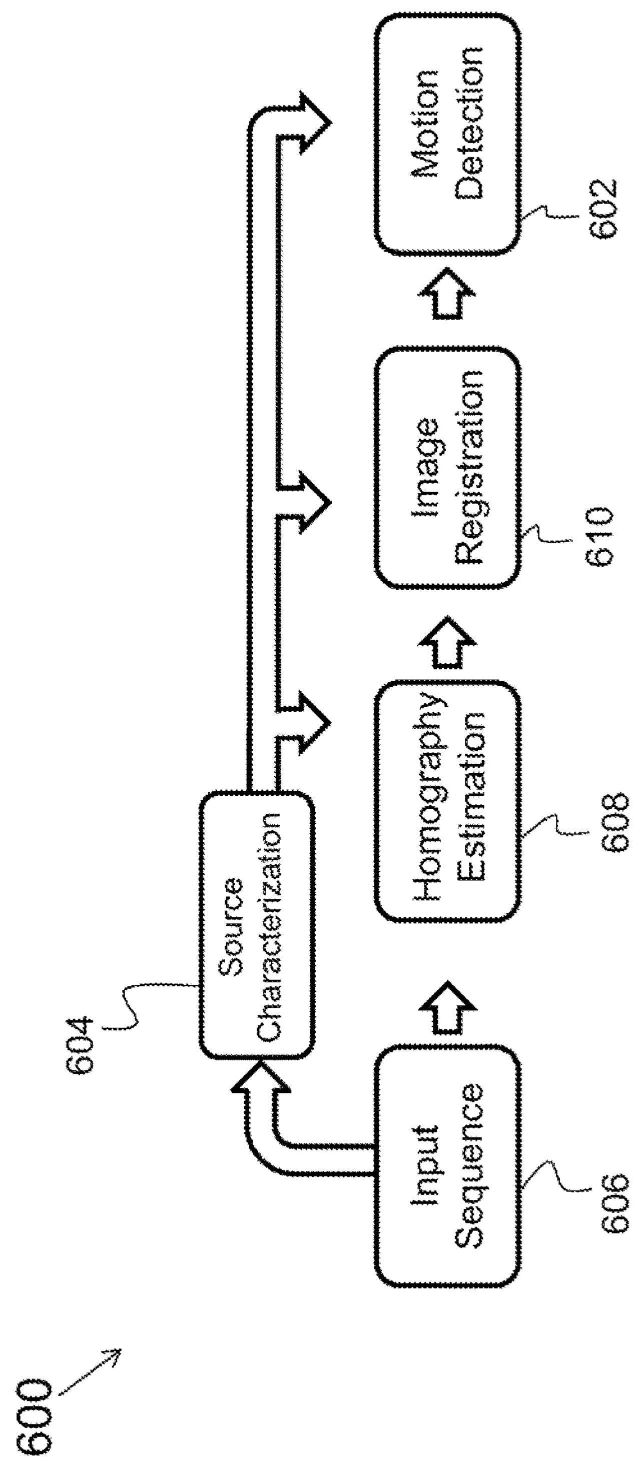
FIG. 6 illustrates parameter initialization by source detection according to principles of the present invention.

FIG. 6 shows a source detection process 600 according to the present invention. The source detection process 600 is a pre-process of the motion detection process 602 described above. In this process, several characteristics of a source (e.g., sensor, object), such as camera motion, object speed, contrast, and brightness of the source, are determined by a source characterization module 604. Based upon these characteristics, several parameters of the motion detection process 602 can be determined for optimal results.

Upon receiving an input sequence 606 (e.g., video), the source detection process 600 begins with homography estimation 608, which is the process needed to register one frame to another before applying the methods 1 to 4 described above. A homography defines a mapping between a reference frame and another image frame. This homography mapping function is determined using feature mapping correspondences between the two frames. Homography estimation is described by Lin et al. in "Map-Enhanced UAV Image Sequence Registration" in WACV, IEEE Computer Society, pg. 15, 2007, which is hereby incorporated by reference as though fully set forth herein.

Using homography estimation 608, forward and backward images can be registered into the reference frame (i.e., image registration 610). By taking differences between the reference image and the registered images, the motion region in the registered images is detected with the motion detection process 602, as described above.

As a non-limiting example, based on the average object speed, the source characterization module 604 sets several important parameters, such as the threshold value, the number of forward-backward frames to use for image registration 610, and the type of detection method to use in the motion detection process 602. The object speed can be estimated by an object's motion detections and its tracking through frames. The thresholding process, described above, is embedded in the motion detection process 602. For instance, if an input sequence 606 has slow moving objects, one can set the number of forward-backward frames to use for image registration 610 as high. The accumulated frame differences between frames can be small for a slow moving object, so an object region might not be correctly detected or partially detected. On the other hand, when the moving objects are fast, then the number of frames to use for image registration 610 could be small, and the detection region could be bigger. With this parameter selection scheme, the motion detection method could be selected out of the four methods described above so that correct parameters are initialized and processed.

Figure 7:
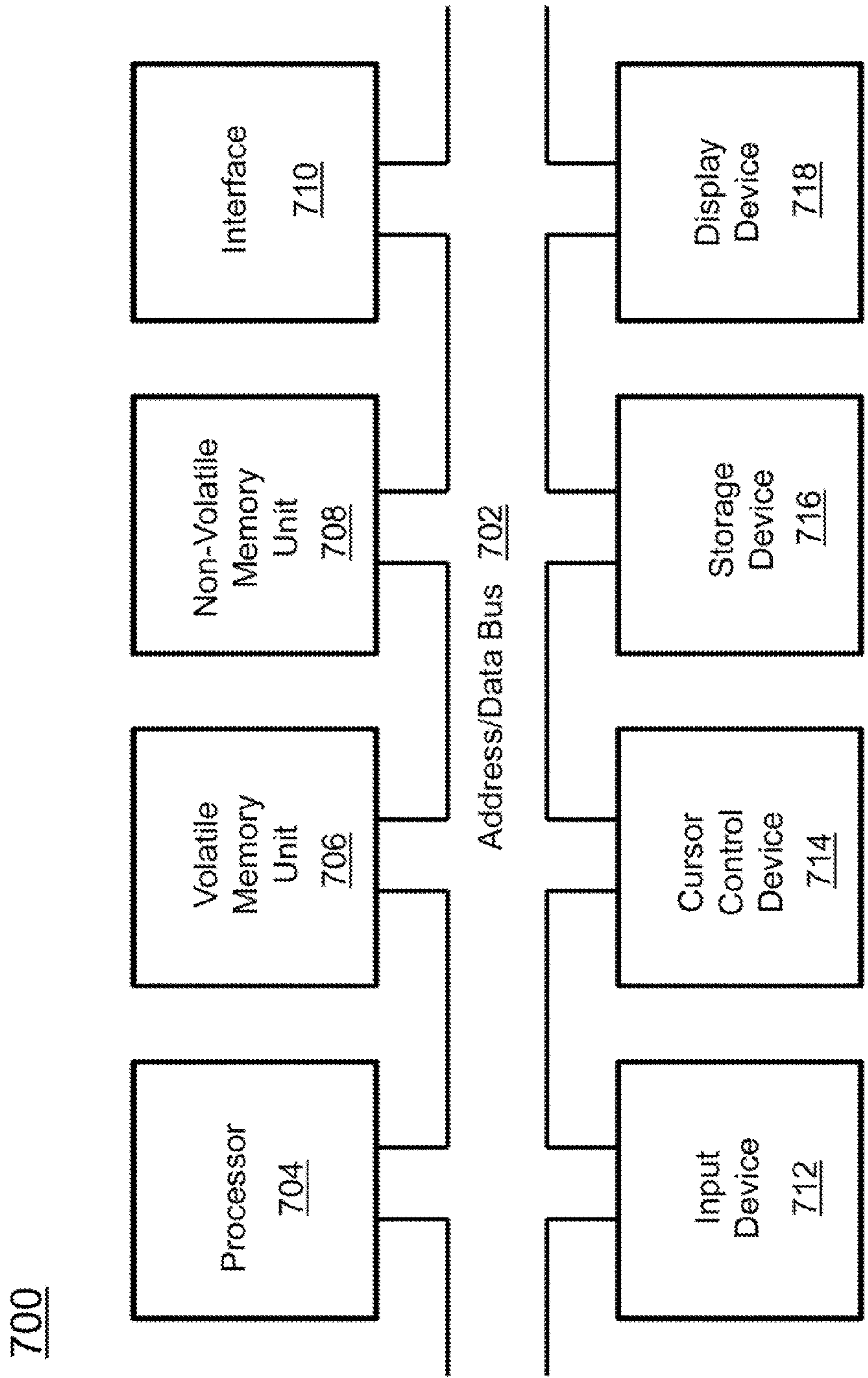
FIG. 7 is an illustration of a data processing system according to principles of the present invention.

An example of a computer system 700 in accordance with one aspect is shown in FIG. 7. The computer system 700 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 700. When executed, the instructions cause the computer system 700 to perform specific actions and exhibit specific behavior, such as described herein.

The computer system 700 may include an address/data bus 702 that is configured to communicate information. Additionally, one or more data processing units, such as a processor 704, are coupled with the address/data bus 702. The processor 704 is configured to process information and instructions. In one aspect, the processor 704 is a microprocessor. Alternatively, the processor 704 may be a different type of processor such as a parallel processor, or a field programmable gate array.

The computer system 700 is configured to utilize one or more data storage units. The computer system 700 may include a volatile memory unit 706 (e.g., random access memory ("RAM"), static RAM, dynamic RAM, etc.) coupled with the address/data bus 702, wherein a volatile memory unit 706 is configured to store information and instructions for the processor 704. The computer system 700 further may include a non-volatile memory unit 708 (e.g., read-only memory ("ROM"), programmable ROM ("PROM"), erasable programmable ROM ("EPROM"), electrically erasable programmable ROM "EEPROM"), flash memory, etc.) coupled with the address/data bus 702, wherein the non-volatile memory unit 708 is configured to store static information and instructions for the processor 704. Alternatively, the computer system 700 may execute instructions retrieved from an online data storage unit such as in "Cloud" computing. In an embodiment, the computer system 700 also may include one or more interfaces, such as an interface 710, coupled with the address/data bus 702. The one or more interfaces are configured to enable the computer system 700 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 700 may include an input device 712 coupled with the address/data bus 702, wherein the input device 712 is configured to communicate information and command selections to the processor 700. In accordance with one aspect, the input device 712 is an alphanumeric input device, such as a keyboard, that may include alphanumeric and/or function keys. Alternatively, the input device 712 may be an input device other than an alphanumeric input device. In one aspect, the computer system 700 may include a cursor control device 714 coupled with the address/data bus 702, wherein the cursor control device 714 is configured to communicate user input information and/or command selections to the processor 700. In one aspect, the cursor control device 714 is implemented using a device such as a mouse, a track-ball, a track-pad, an optical tracking device, or a touch screen. The foregoing notwithstanding, in one aspect, the cursor control device 714 is directed and/or activated via input from the input device 712, such as in response to the use of special keys and key sequence commands associated with the input device 712. In an alternative aspect, the cursor control device 714 is configured to be directed or guided by voice commands.

In one aspect, the computer system 700 further may include one or more optional computer usable data storage devices, such as a storage device 716, coupled with the address/data bus 702. The storage device 716 is configured to store information and/or computer executable instructions. In one aspect, the storage device 716 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 718 is coupled with the address/data bus 702, wherein the display device 718 is configured to display video and/or graphics. In one aspect, the display device 718 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 700 presented herein is an example computing environment in accordance with one aspect. However, the non-limiting example of the computer system 700 is not strictly limited to being a computer system. For example, one aspect provides that the computer system 700 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 8:
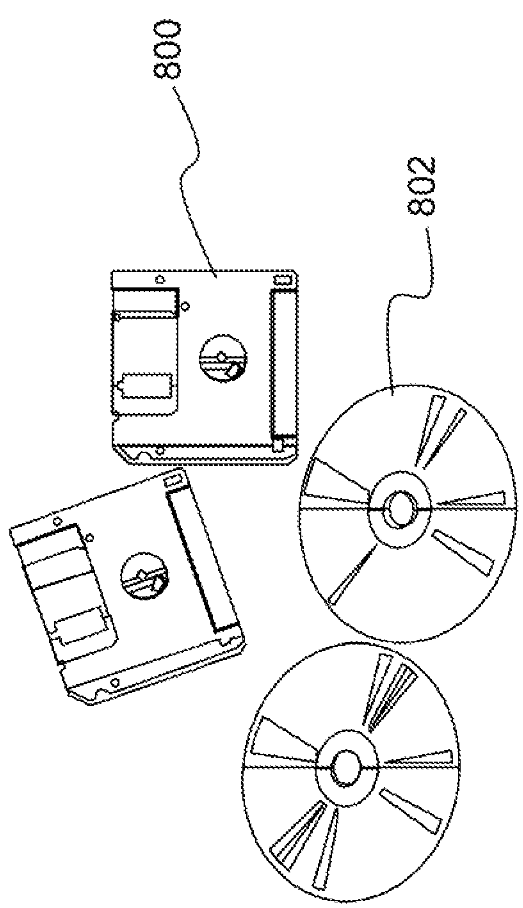
FIG. 8 is an illustration of a computer program product according to principles of the present invention.

An illustrative diagram of a computer program product embodying the present invention is depicted in FIG. 8. As a non-limiting example, the computer program product is depicted as either a floppy disk 800 or an optical disk 802. However, as mentioned previously, the computer program product generally represents computer readable code (i.e., instruction means or instructions) stored on any compatible non-transitory computer readable medium.

What is claimed is:

1. A system for detecting moving objects using multi-frame motion history images, the system comprising:

one or more processors and a non-transitory computer-readable medium having instructions encoded thereon such that when the instructions are executed, the one or more processors perform operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the one or more processors further perform operations of:

accumulating absolute values of the frame differences to generate the motion response value; and applying the selected threshold to the motion response value according to the following:

$$D=Th[\Sigma_{i=0}^{2k}\text{abs}(F_k-F_i)],$$

where Th denotes threshold, Σ represents a summation, 2 k is the total number of registered image frames registered to the coordinate system of the reference image frame, abs represents absolute value, $F_k$ represents the reference image frame, and $F_i$ represents a registered image frame.

2. A system for detecting moving objects using multi-frame motion history images, the system comprising:

one or more processors and a non-transitory computer-readable medium having instructions encoded thereon such that when the instructions are executed, the one or more processors perform operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the one or more processors further perform operations of:

calculating, then accumulating absolute values of the frame differences for forward and backward registered image frames separately to generate a motion response value for each of the forward and backward registered image frames;

applying the selected threshold to each of the motion response values; and computing the intersection of the motion response values according to the following:

$$D=Th[\Sigma_{i=0}^{k-1}\text{abs}(F_k-F_i)]\cap Th[\Sigma_{i=k+1}^{2k}\text{abs}(F_k-F_i)],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and ∩ represents an intersection.

3. A system for detecting moving objects using multi-frame motion history images, the system comprising:

one or more processors and a non-transitory computer-readable medium having instructions encoded thereon such that when the instructions are executed, the one or more processors perform operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the one or more processors further perform operations of:

accumulating polarized differences between the reference image frame and the consecutive registered image frames for forward and backward registered image frames separately to generate a motion response value for each of the forward and backward registered image frames;

applying the selected threshold to each of the motion response values; and computing the intersection of the motion response values according to the following $$D=Th[\Sigma_{i=0}^{k-1}(F_k-F_i)]\cap Th[\Sigma_{i=k+1}^{2k}(F_k-F_i)],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and ∩ represents an intersection.

4. A system for detecting moving objects using multi-frame motion history images, the system comprising:

one or more processors and a non-transitory computer-readable medium having instructions encoded thereon such that when the instructions are executed, the one or more processors perform operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the one or more processors further perform operations of:

calculating squared differences between the reference image frame and the consecutive registered image frames;

accumulating the squared differences for forward and backward registered image frames separately to generate forward and backward accumulations;

determining a pixel-wise minimum value between the forward and backward accumulations; and applying the selected threshold to the pixel-wise minimum value according to the following:

$$D=Th[\mathrm{Min}\{\Sigma_{i=0}^{k-1}(F_k-F_i)^2,\Sigma_{i=k+1}^{2k}(F_k-F_i)^2\}],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and Min represents minimization.

5. A system for adaptive parameter optimization by input image characterization, the system comprising:

one or more processors and a non-transitory computer-readable medium having instructions encoded thereon such that when the instructions are executed, the one or more processors perform operations of:

receiving an input image sequence comprising a plurality of image frames;

detecting at least one characteristic of an input source related to the input image sequence;

setting at least one parameter based on the at least one characteristic of the input source;

using homography estimation, registering consecutive image frames in the plurality of image frames into a reference image frame;

wherein the at least one parameter is used to determine at least one of:

a number of consecutive image frames to use for registration; and a selected threshold value to apply to accumulated frame differences between each of the consecutive registered image frames and the reference image frame;

using the at least one parameter to select a motion detection method; and detecting at least one moving object in the input image sequence using the selected motion detection method, wherein in using the selected motion detection method, frame differences between each of the consecutive registered image frames and the reference image frame are computed;

the frame differences are accumulated to compute a motion response value; and a threshold function is applied to the motion response value, wherein the threshold function is a sum of absolute differences between the reference image frame and the registered consecutive image frames.

6. A computer-implemented method for detecting moving objects using multi-frame motion history images, comprising an act of:

causing one or more processors to execute instructions stored on a non-transitory memory such that upon execution, the one or more processors performs operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the data processor further perform operations of:

accumulating absolute values of the frame differences to generate the motion response value; and applying the selected threshold to the motion response value according to the following:

$$D=Th[\Sigma_{i=0}^{2k}\text{abs}(F_k-F_i)],$$

where Th denotes threshold, Σ represents a summation, 2 k is the total number of registered image frames registered to the coordinate system of the reference image frame, abs represents absolute value, $F_k$ represents the reference image frame, and $F_i$ represents a registered image frame.

7. A computer-implemented method for detecting moving objects using multi-frame motion history images, comprising an act of:

causing one or more processors to execute instructions stored on a non-transitory memory such that upon execution, the one or more processors performs operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the data processor further performs operations of:

calculating, then accumulating absolute values of the frame differences for forward and backward registered image frames separately to generate a motion response value for each of the forward and backward registered image frames;

applying the selected threshold to each of the motion response values; and computing the intersection of the motion response values according to the following:

$$D=Th[\Sigma_{i=0}^{k-1}\text{abs}(F_k-F_i)]\cap Th[\Sigma_{i=k+1}^{2k}\text{abs}(F_k-F_i)],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and ∩ represents an intersection.

8. A computer-implemented method for detecting moving objects using multi-frame motion history images, comprising an act of:

causing one or more processors to execute instructions stored on a non-transitory memory such that upon execution, the one or more processors performs operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the data processor further performs operations of:

accumulating polarized differences between the reference image frame and the consecutive registered image frames for forward and backward registered image frames separately to generate a motion response value for each of the forward and backward registered image frames;

applying the selected threshold to each of the motion response values; and computing the intersection of the motion response values according to the following:

$$D=Th[\Sigma_{i=0}^{k-1}(F_k-F_i)]\cap Th[\Sigma_{i=k+1}^{2k}(F_k-F_i)],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and ∩ represents an intersection.

9. A computer-implemented method for detecting moving objects using multi-frame motion history images, comprising an act of:

causing one or more processors to execute instructions stored on a non-transitory memory such that upon execution, the one or more processors performs operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the data processor further performs operations of:

calculating squared differences between the reference image frame and the consecutive registered image frames;

accumulating the squared differences for forward and backward registered image frames separately to generate forward and backward accumulations;

determining a pixel-wise minimum value between the forward and backward accumulations; and applying the selected threshold to the pixel-wise minimum value according to the following:

$$D=Th[\text{Min}\{\Sigma_{i=0}^{k-1}(F_k-F_i)^2,\Sigma_{i=k+1}^{2k}(F_k-F_i)^2\}],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and Min represents minimization.

10. A computer-implemented method for adaptive parameter optimization by input image characterization, comprising:

an act of causing a data processor to execute instructions stored on a non-transitory memory such that upon execution, the data processor performs operations of:

receiving an input image sequence comprising a plurality of image frames;

detecting at least one characteristic of an input source related to the input image sequence;

setting at least one parameter based on the at least one characteristic of the input source;

using homography estimation, registering consecutive image frames in the plurality of image frames into a reference image frame;

wherein the at least one parameter is used to determine at least one of:

a number of consecutive image frames to use for registration; and a selected threshold value to apply to accumulated frame differences between each of the consecutive registered image frames and the reference image frame;

using the at least one parameter to select a motion detection method; and detecting at least one moving object in the input image sequence using the selected motion detection method, wherein in using the selected motion detection method, frame differences between each of the consecutive registered image frames and the reference image frame are computed;

the frame differences are accumulated to compute a motion response value; and a threshold function is applied to the motion response value, wherein the threshold function is a sum of absolute differences between the reference image frame and the registered consecutive image frames.

11. A computer program product for detecting moving objects using multi-frame motion history images, the computer program product comprising computer-readable instructions stored on a non-transitory computer-readable medium that are executable by a computer having a processor for causing the processor to perform operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the computer program product further comprises instructions for causing the processor to perform operations of:

accumulating absolute values of the frame differences to generate the motion response value; and applying the selected threshold to the motion response value according to the following:

$$D=Th[\Sigma_{i=0}^{2k}\text{abs}(F_k-F_i)],$$

where Th denotes threshold, Σ represents a summation, 2 k is the total number of registered image frames registered to the coordinate system of the reference image frame, abs represents absolute value, $F_k$ represents the reference image frame, and $F_i$ represents a registered image frame.

12. A computer program product for detecting moving objects using multi-frame motion history images, the computer program product comprising computer-readable instructions stored on a non-transitory computer-readable medium that are executable by a computer having a processor for causing the processor to perform operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the computer program product further comprises instructions for causing the processor to perform operations of:

calculating, then accumulating absolute values of the frame differences for forward and backward registered image frames separately to generate a motion response value for each of the forward and backward registered image frames;

applying the selected threshold to each of the motion response values; and computing the intersection of the motion response values according to the following:

$$D=Th[\Sigma_{i=0}^{k-1}\text{abs}(F_k-F_i)]\cap Th[\Sigma_{i=k+1}^{2k}\text{abs}(F_k-F_i)],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and ∩ represents an intersection.

13. A computer program product for detecting moving objects using multi-frame motion history images, the computer program product comprising computer-readable instructions stored on a non-transitory computer-readable medium that are executable by a computer having a processor for causing the processor to perform operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the computer program product further comprises instructions for causing the processor to perform operations of:

accumulating polarized differences between the reference image frame and the consecutive registered image frames for forward and backward registered image frames separately to generate a motion response value for each of the forward and backward registered image frames;

applying the selected threshold to each of the motion response values; and computing the intersection of the motion response values according to the following:

$$D=Th[\Sigma_{i=0}^{k-1}(F_k-F_i)]\cap Th[\Sigma_{i=k+1}^{2k}(F_k-F_i)],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and ∩ represents an intersection.

14. A computer program product for detecting moving objects using multi-frame motion history images, the computer program product comprising computer-readable instructions stored on a non-transitory computer-readable medium that are executable by a computer having a processor for causing the processor to perform operations of:

receiving an input video sequence of consecutive registered image frames, wherein the sequence of consecutive registered image frames comprises forward and backward registered image frames registered to a coordinate system of a reference image frame;

computing frame differences between each of the consecutive registered image frames and the reference image frame;

accumulating the frame differences based on characteristics of the input video sequence to compute a corresponding motion response value; and applying a selected threshold value to the motion response value to produce at least one binary image used for detection of moving objects in the input video sequence, wherein the computer program product further comprises instructions for causing the processor to perform operations of:

calculating squared differences between the reference image frame and the consecutive registered image flames;

accumulating the squared differences for forward and backward registered image frames separately to generate forward and backward accumulations;

determining a pixel-wise minimum value between the forward and backward accumulations; and applying the selected threshold to the pixel-wise minimum value according to the following:

$$D=Th[\mathrm{Min}\{\Sigma_{i=0}^{k-1}(F_k-F_i)^2,\Sigma_{i=k+1}^{2k}(F_k-F_i)^2\}],$$

where Th denotes threshold, Σ represents a summation, k is an index of the reference image frame, 2 k is the total number of registered image frames registered to the coordinate system of the reference image frame, abs represents absolute value, $F_k$ represents the reference image frame, $F_i$ represents a registered image frame, and Min represents minimization.

15. A computer program product for adaptive parameter optimization by input image characterization, the computer program product comprising computer-readable instructions stored on a non-transitory computer-readable medium that are executable by a computer having a processor for causing the processor to perform operations of:

receiving an input image sequence comprising a plurality of image frames;

detecting at least one characteristic of an input source related to the input image sequence;

setting at least one parameter based on the at least one characteristic of the input source;

using homography estimation, registering consecutive image frames in the plurality of image frames into a reference image frame;

wherein the at least one parameter is used to determine at least one of:

a number of consecutive image frames to use for registration; and a selected threshold value to apply to accumulated frame differences between each of the consecutive registered image frames and the reference image frame;

using the at least one parameter to select a motion detection method; and detecting at least one moving object in the input image sequence using the selected motion detection method, wherein in using the selected motion detection method, frame differences between each of the consecutive registered image frames and the reference image frame are computed;

the frame differences are accumulated to compute a motion response value; and a threshold function is applied to the motion response value, wherein the threshold function is a sum of absolute differences between the reference image frame and the registered consecutive image frames.

16. The system as set forth in claim 5, wherein the one or more processors further perform an operation of:

applying the selected threshold value to the motion response value according to the following:

$$D=Th[\Sigma_{i=0}^{2k}\mathrm{abs}(F_k-F_i)],$$

where Th denotes threshold, Σ represents a summation, 2 k is the total number of registered image frames registered to a coordinate system of the reference image frame, abs represents absolute value, $F_k$ represents the reference image frame, and $F_i$ represents a registered image frame.

17. The method as set forth in claim 10, wherein the one or more processors further perform an operation of:

applying the selected threshold value to the motion response value according to the following:

$$D=Th[\Sigma_{i=0}^{2k}\mathrm{abs}(F_k-F_i)],$$

where Th denotes threshold, Σ represents a summation, 2 k is the total number of registered image frames registered to a coordinate system of the reference image frame, abs represents absolute value, $F_k$ represents the reference image frame, and $F_i$ represents a registered image frame.

18. The computer program product as set forth in claim 15, further comprising instructions for causing the one or more processors to perform an operation of:

applying the selected threshold value to the motion response value according to the following:

$$D=Th[\Sigma_{i=0}^{2k}\mathrm{abs}(F_k-F_i)],$$

where Th denotes threshold, Σ represents a summation, 2 k is the total number of registered image frames registered to a coordinate system of the reference image frame, abs represents absolute value, $F_k$ represents the reference image frame, and $F_i$ represents a registered image frame.

* * * * *